United States Patent [19]

Crull

[11] 4,019,596
[45] Apr. 26, 1977

[54] SYNCHRONOUS CONTROL SYSTEM

[75] Inventor: Stanley W. Crull, Ames, Iowa

[73] Assignee: Sundstrand Corporation, Rockford, Ill.

[22] Filed: Dec. 30, 1975

[21] Appl. No.: 645,391

[52] U.S. Cl. .............................................. 180/6.48
[51] Int. Cl.² ........................................ B62D 11/06
[58] Field of Search ................. 180/6.48, 6.7, 6.66; 91/171; 60/420, 445, 484, 700, 701

[56] References Cited

UNITED STATES PATENTS

| | | | |
|---|---|---|---|
| 2,859,591 | 11/1958 | Zimmerman | 91/171 X |
| 3,812,925 | 5/1974 | Lauck | 180/6.48 |
| 3,862,668 | 1/1975 | Ward | 180/6.48 |

Primary Examiner—Joseph E. Peters, Jr.
Assistant Examiner—R. Schrecengost
Attorney, Agent, or Firm—Wegner, Stellman, McCord, Wiles & Wood

[57] ABSTRACT

A synchronous control system for a pair of hydrostatic transmissions and more particularly a drive for a vehicle using a pair of hydrostatic transmissions with each driving a propulsion member and a straight tracking control therefor, with the system having a pair of pressure-responsive displacement controls, associated one with each transmission and pressure lines connected thereto for providing a control pressure signal which is applied to a displacement control. A rotary valve with a pair of relatively rotatable valve members connected one to each of the two transmissions for rotation proportional to the output speed of the transmissions and connected into said pressure lines and having port means which have their relation varied, dependent upon a displacement in the position of one valve member with respect to the other to connect a pressure line to a sump and thereby modify the control pressure in said last-mentioned pressure line, to result in modifying the speed of one transmission and bring the two transmissions back to synchronized speed.

19 Claims, 9 Drawing Figures

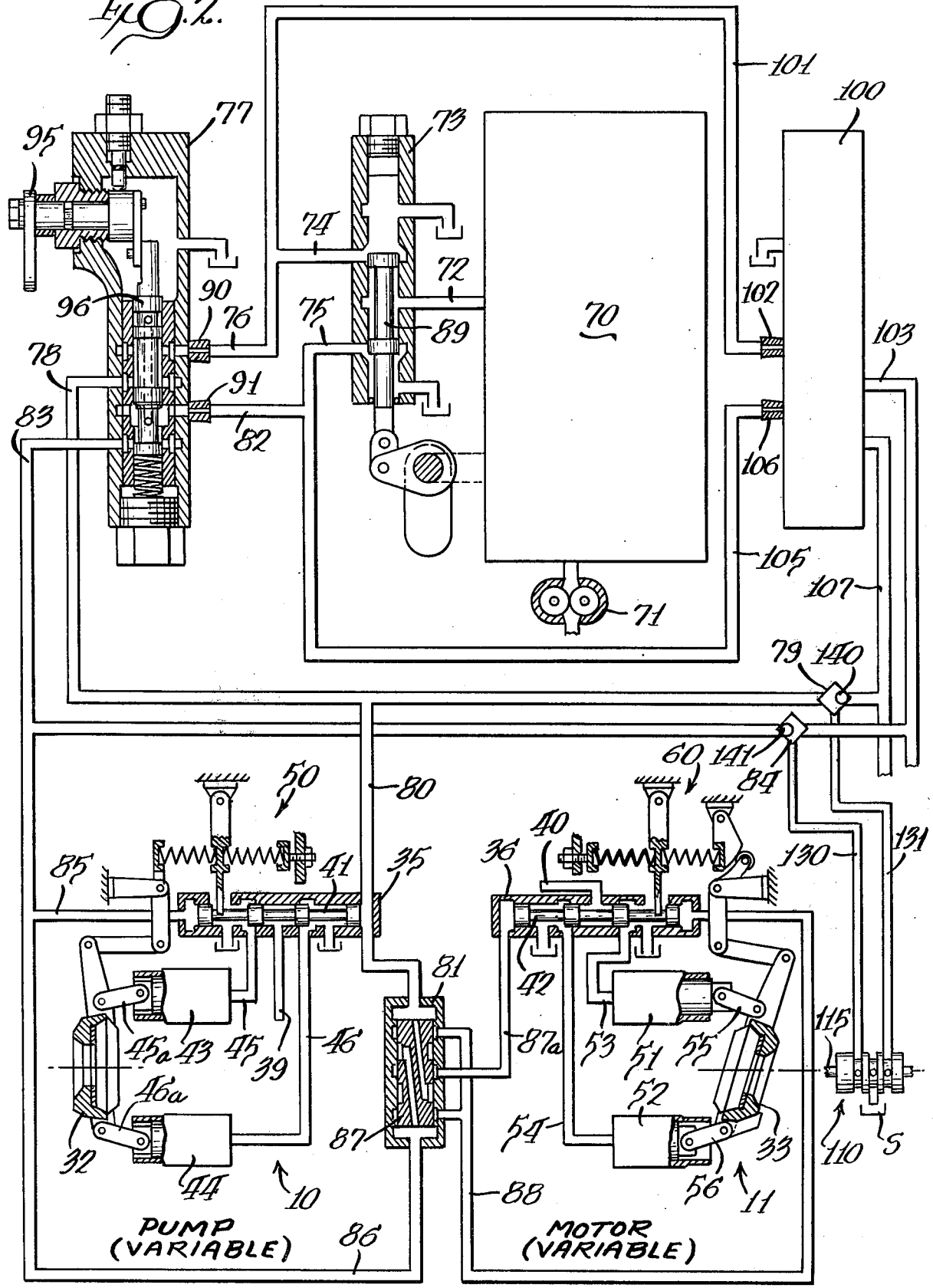

SYNCHRONOUS CONTROL SYSTEM

BACKGROUND OF THE INVENTION

This invention pertains to a synchronous control system for a pair of hydrostatic transmissions for sensing a variation in the output speeds of the two transmissions and making a correction in the speed of one of said transmissions to synchronize the speeds thereof. More particularly, the synchronous control system is a tracking control in a vehicle drive, having the pair of transmissions, each driving a propulsion member, whereby a difference in speed of the propulsion members is sensed and a correction is made in the speed of one hydrostatic transmission and associated propulsion member to bring the speeds back to synchronization, to provide for straight line movement of the vehicle. Vehicles using a dual path hydrostatic transmission system frequently exhibit a tendency to mistrack when the operator intends for the vehicle to go in a straight line. This mistracking occurs because of manufacturing tolerances and inefficiencies of the transmissions. U.S. Pat. No. 3,247,919, owned by the assignee of this application, discloses an early form of steering control, wherein a differential sensed the output speed of two transmissions and controlled a pump to provide a signal to a steering control cylinder in order to correct any mistracking.

The use of two pumps, driven one by each of two hydrostatic transmissions to obtain tracking control, is shown in Chatterjea U.S. Pat. No. 3,677,362. A similar type structure is shown in Ward Pat. No. 3,795,107 and the latter patent makes reference to several earlier patents as disclosing tracking controls.

Ward U.S. Pat. No. 3,862,668 discloses a hydrostatic transmission control system wherein a rotary valve has a pair of rotatable valve elements driven, one by each of a pair of hydrostatic transmissions, and with the rotary valve functioning to deliver a correctional control signal to a displacement control for one of the hydrostatic transmissions. A modified form of steering control valve is disclosed in this patent which acts to block the straight tracking valve assembly when a steering control valve is actuated. This may be for the purpose of avoiding a possible tendency for the transmissions to gradually reduce to zero speed when a steering control valve is actuated in the primary embodiment.

A synchronous control for cylinder motors associated with a hydraulic metal working press and using a rotary valve having a pair of relatively rotatable valve members controlling communication of a pair of lines to tank is shown in Zimmerman U.S. Pat. No. 2,859,591.

SUMMARY

A primary feature of the invention is to provide a synchronous control system for a pair of hydrostatic transmissions, with each transmission having a displacement control for controlling the output speed thereof and which is responsive to a control pressure for setting the speed and wherein valve means are operable in response to a difference in the output speed of said transmissions for modifying the value of the control pressure applied to one displacement control for bringing the transmission associated with the last-mentioned displacement control to a speed which matches the speed of the other hydrostatic transmission. This feature of the invention is accomplished by valve means which selectively controls the connection of a displacement control pressure line to sump whereby the control pressure may have a value different than that set by a master speed control, dependent upon the degree to which the valve means connects a pressure line to the sump.

In accordance with the invention, as set forth in the preceding paragraph, the valve means has restricted flow passages which connect the pressure lines to sump, whereby the pressure lines may be connected to sump when the transmissions are synchronized and when the speed of one transmission changes relative to the other, the flow path to the sump is reduced or completely closed by change in relation of the valve means whereby the control pressure increases in one pressure line and a correspondingly higher control pressure is applied to one of the displacement controls. In another embodiment, the flow passages to sump are closed when the transmissions are operating at the same speed and a flow passage from one pressure line to sump will gradually open as the transmissions move out of synchronized speed relation to reduce the control pressure in one pressure line for reducing the speed of one transmission.

A primary use of the synchronous control system is as a tracking control for a vehicle having a dual path hydrostatic transmission system wherein the two hydrostatic transmissions which have a displacement control for one or both of the pump and motor thereof are each associated with a propulsion member, such as the track of a track-type vehicle. In a dual path system of the type disclosed herein, a speed control valve sets a control pressure which is applied to the displacement controls through one or the other of a pair of pressure lines associated with each displacement control and which provide for forward or reverse operation, dependent upon the pressure line which receives the control pressure. The selection of the desired direction of operation is by a directional control valve which determines the connection to one or the other of the pressure lines of each displacement control. Each pair of pressure lines has a steering control valve associated therewith. The steering control valve has the ability to modify the control pressure set by the speed control valve to change the speed of an associated transmission for steering and may function to reverse the connection of the control pressure signal between the two pressure lines of a displacement control for causing reverse operation of the associated hydrostatic transmission..

In such a vehicle drive system, the valve means providing tracking control has a pair of inlets connected into one pressure line from each pair of pressure lines and a connection to sump and with the valve means positionable dependent upon the relation of the speeds of the two transmissions to either maintain the control pressure in the pressure lines or modify it in one pressure line. The valve means provides tracking control in both forward and reverse operation by being connected to one pressure line from each of said pairs and with the pressure lines being interconnected, but having a pair of oppositely-acting check valves to prevent cross-connection between the two pressure lines.

The aforesaid valve means includes valve members with port mens positionable to control the connection of one or the other of said inlets to the sump and with the port means including flow restrictions, whereby the maximum correction in control pressure is in the range of 10% of the set control pressure in a pressure line.

Because of this, the steering control valve can override the tracking control function of the system whereby the speed of one transmission and associated propulsion member can vary from the speed of the other in an amount beyond the correction capability of the valve means. The valve members are relatively rotatable with one valve member being associated with each transmission for rotation proportional to the output speed thereof and with means in the drive connection for one valve member to permit slipping thereof and with interconnecting means between the rotatable valve members for limiting the maximum degree of rotational shift of one valve member relative to the other when there is a difference in speed of the transmissions.

The displacement controls of the dual path transmission includes an orifice in each of the pressure lines which may be appropriately sized in order to give proper steering characteristics for the system and, therefore, may be of different sizes. With the orifices possibly being of different sizes, it may not be possible to obtain the same maximum correcting change in the control pressure in all of the pressure lines by means of the rotary valve disclosed herein. As disclosed herein, an additional orifice can be placed in each of the pressure lines and each of said additional orifices can be adjusted in size in order to give equal maximum corrections in the control pressure resulting from operation of the rotary valve. The use of these additional orifices facilitates manufacture of the rotary valve since the size and tolerance of the flow-restricting ports in the rotary valve can be increased.

BRIEF DESCRIPTION OF THE DRAWING

FIG. 2 is a diagrammatic view of the dual path transmission and showing the displacement control for one of the hydrostatic transmissions;

DESCRIPTION OF THE PREFERRED EMBODIMENTS

Figure 1:
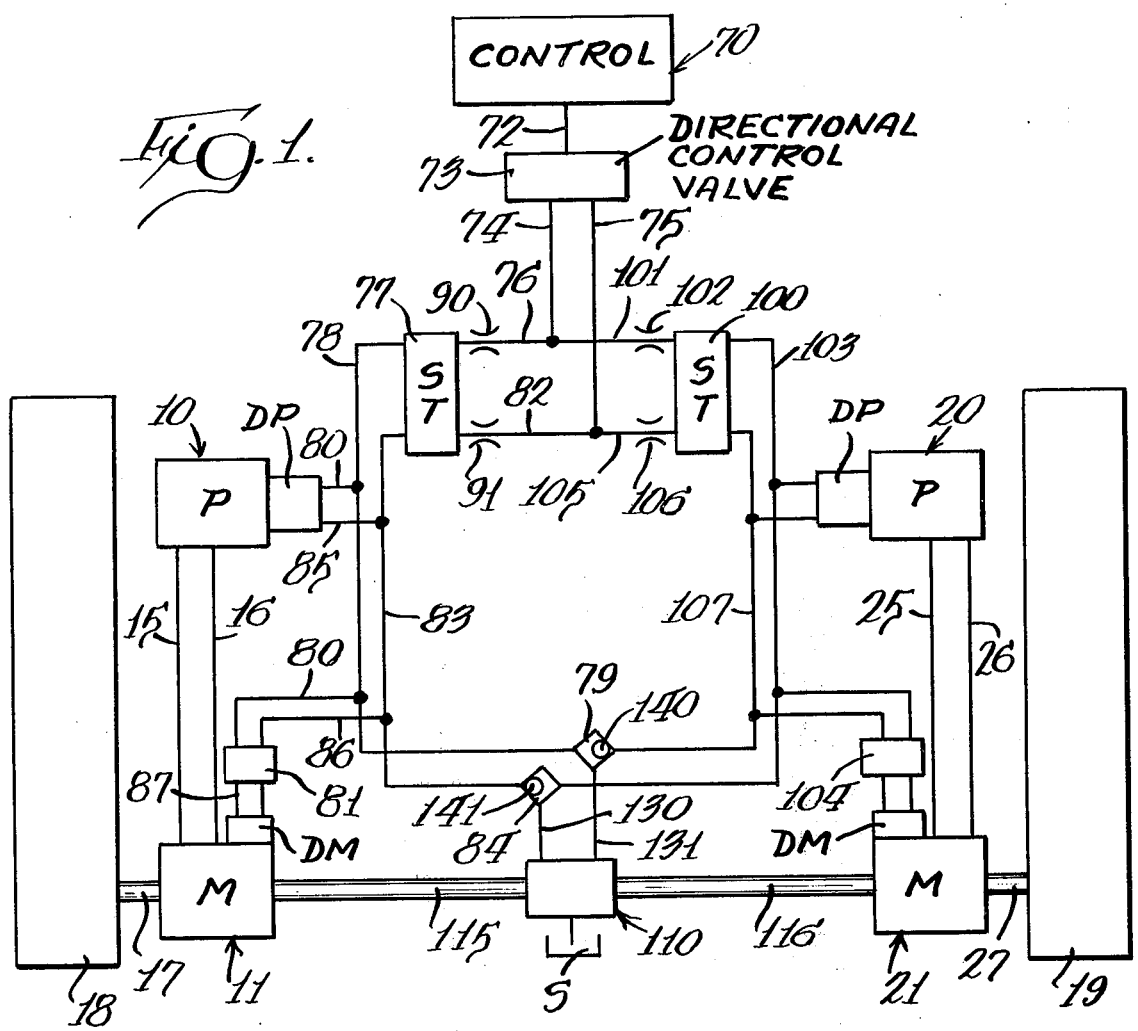
FIG. 1 is a schematic view of a dual path hydrostatic transmission with the tracking control.

The dual path hydrostatic transmission shown generally in FIGS. 1 and 2 is of the same type and structure disclosed in an application of Donald J. MacIntosh and Edward L. Stout, Ser. No. 559,301, filed Mar. 17, 1975, now U.S. Pat. No. 3,946,560, as a continuation of Ser. No. 442,190, filed Feb. 13, 1974, now abandoned, with said application being owned by the assignee of this application. Reference may be made to said prior application for a more detailed description of the structure and operation of a dual path hydrostatic transmission and the controls therefor.

One hydrostatic transmission has a pump 10 and a motor 11 interconnected by fluid lines 15 and 16 whereby fluid is delivered from and returned to the pump 10. The motor 11 has an output including a shaft 17 for driving a propulsion member, such as a track 18 of a dual track vehicle. The other track 19 of the vehicle has a hydrostatic transmission with a pump 20 and a motor 21 interconnected by fluid lines 25 and 26 and with the drive to the track including a shaft 27. The details of a hydrostatic transmission are shown in the aforesaid MacIntosh and Stout application and are incorporated herein by reference.

One or both of the pump and motor of a hydrostatic transmission may be of a variable displacement type and as shown in FIG. 2, both the pump 10 and motor 11 are of the variable displacement type. The pump 10 has a variable angle reversible swashplate 32 for controlling the stroke of pistons carried within axially extending bores of a driven rotatable cylinder (not shown). The motor 11 has a variable angle swashplate 33 movable from a maximum displacement position shown to a minimum displacement position somewhat greater than zero. The swashplate 33 of the motor engages reciprocable pistons movable in a bore in a rotatable cylinder block attached to the output shaft 17 for causing reciprocation of the pistons and rotation of the cylinder block and the output shaft as high pressure fluid is supplied to the motor from the pump.

Displacement controls for the pump and motor of the hydrostatic transmissions are shown at DP & DM in FIG. 1 and include a displacement control valve 35 associated with the pump 10 and a displacement control valve 36 associated with the motor 11. There are similar displacement control valves associated with the pump and motor of the other hydrostatic transmission. Each of the displacement control valves 35 and 36 has a connection to a charge pressure circuit, by means of lines 39 and 40, respectively, and has an axially shiftable valve spool 41 and 42, respectively, which are positionable to control the delivery of charge fluid to one or the other of a pair of control cylinders, with there being pump control cylinders 43 and 44 connected to the displacement control valve 35 by lines 45 and 46, respectively, and operable through links 45a and 46a for positioning the swashplate 32. As shown in Fig. 2, the pump swashplate 32 is in neutral position, as maintained by springs (not shown) within the control cylinders 43 and 44 whereby entry of fluid under pressure into one of the cylinders will cause the swashplate to tilt or pivot in one direction, while the delivery of fluid under pressure to the opposite cylinder, will cause opposite pivoting of the swashplate. This permits a selectivity in the direction of flow to the motor 11 through either of lines 15 and 16 for forward and reverse operation and also the volume output of the pump for speed of operation of the motor.

Feedback means, indicated generally at 50, are associated with the pump displacement control, including linkage connected to the swashplate and yieldably connected through springs to the valve spool 41 for providing a feedback indication as to positioning of the swashplate and providing a null position for the valve spool 41. Reference may be made to the prior MacIntosh and Stout application for a detailed description of the structure and operation of the feedback mechanism which is incorporated herein by reference.

The motor displacement control valve 36 similarly controls the supply of charge fluid to either of control cylinders 51 and 52 which are connected to the control valve 36 by means of lines 53 and 54, respectively. The action of the cylinders in positioning the swashplate 33 through operation of either of the links 55 and 56 is the same as that described in connection with the positioning of the pump swashplate.

The displacement control for the motor includes a feedback means, indicated generally at 60, for providing a null position for the valve spool 42 responding to the position of the swashplate 33. This structure and the operation thereof is fully described in the above-mentioned MacIntosh and Stout application and reference may be made thereto for a more detailed description of this feedback structure. Generally in both of the feedback units, the position of the swashplate is indicated through the mechanical linkage associated therewith and which, through a spring system, operates to shift the valve spool to a null position against the action of a control pressure delivered to the displacement control in a manner to be described.

A control pressure for controlling the speed of the hydrostatic transmissions is set by a control indicated generally at 70 in FIGS. 1 and 2 and being supplied with fluid under pressure by a control pump 71 as may be driven by the engine of the vehicle and providing a rate of fluid flow proportional to engine speed. The control 70 is known in the art and shown in said MacIntosh and Stout application referred to above and may include a throttle valve, a pressure regulator, a horsepower control valve, and a speed control valve which sets a value for the control pressure applied to displacement controls of the hydrostatic transmissions. The speed control valve, which forms part of the control 70, has the established control pressure delivered through a line 72 in a directional control valve 73 having a pair of outlet lines 74 and 75. The directional control valve 73 may block supply of the control pressure signal to either of the line 74 and 75 to provide a neutral position for the dual path transmission or deliver the control pressure signals set by the control 70 to either of lines 74 and 75, depending upon the direction of rotation of the outputs of the hydrostatic transmissions and of the propulsion members of a vehicle when the transmissions are used for driving such propulsion members.

The displacement control for the pump 10 and motor 11 has a pair of pressure lines extended one from each of the outlet lines 74 and 75 of the directional control valve 73. One pressure line includes a line section 76 extending from the outlet line 74 to a steering control valve 77 and a line section 78 extending to a junction 79 and connected to one end of the displacement control valve 35 by a line 80 which also extends to a shuttle valve 81. The other pressure line has a line section 82 extending from the outlet line 75 from the directional control valve and connected to the steering control valve 77 and a line section 83 extending from the steering control valve and to a junction 84. The line section 83 connects through a line section 85 to the displacement control valve 35 at the opposite end thereof from the line section 80 and through a line section 86 to the shuttle valve 81 and to an end thereof opposite from the connection of the line section 80.

The shuttle valve 81 has a valve spool 87 which functions similarly to the shuttle valve disclosed in the MacIntosh and Stout application referred to above to have the control pressure existing in one or the other of line sections 80 and 86 delivered to the same end of the motor displacement control valve 36. More specifically, the control pressure is always delivered to a line 88 leading to the right-hand end of the motor displacement control valve 36, as shown in FIG. 2, and a line 87a always connects to sump through the directional control valve as subsequently described.

The directional control valve 73 is shown in a neutral position in FIG. 2. For forward operation of the hydrostatic transmissions, a valve spool 89 of the directional control valve is shifted upwardly to deliver control pressure to the outlet line 74 and to line section 76 with flow being through a flow-restricting orifice 90. The steering control valve 77, when positioned as shown, permits flow of the control pressure through line section 78 to the displacement control for the transmission to actuate the control cylinder for shifting the swashplate 32 in a direction to cause output to the motor in a direction to cause forward operation of the transmission. As the control pressure increases beyond a value for full shift of the pump swashplate 32 then the motor swashplate 33 will shift. During this operation, the pressure line 83 is connected to sump through the directional control valve 73 and the steering control valve 77. If the directional control valve spool 89 is shifted downwardly, then control pressure is delivered to the line section 82 with flow through a flow-restricting orifice 91 and flow to the pressure line 83 whereby control pressure is supplied to the displacement control cylinder 35 in a manner to cause reverse operation of the variable displacement pump and corresponding reverse rotation of the motor 11.

The steering control valve 77 is shown and described in the MacIntosh and Stout application, referred to above, and reference may be made thereto for more detailed description of the structure and operation.

Generally, the steering control valve has a handle member 95 connected to a valve spool 96 whereby the control pressure delivered thereto through either of the line sections 76 and 82 may be reduced by a cross-connection back to sump as the valve spool is moved and, with complete shift of the valve spool 96, the connection of control pressure to lines 78 and 83 may be reversed for a reversal of operation of direction of one hydrostatic transmission relative to the other. With one or the other of the line 76 or 82 being connected to the sump, it will be seen that the line 87 associated with the motor displacement control is always connected to sump through one or the other of line sections 80 and 86 leading back to the directional control valve through the steering control valve 77.

The transmission associated with the propulsion member 19 is of the same construction as described in FIGS. 1 and 2 for the transmission associated with propulsion member 18, including a steering control valve 100 connected into a pair of pressure lines. One pressure line includes a line section 101 connected to the outlet line 74 of the directional control valve and having an orifice 102 and a line section 103 extending to the pump displacement control valve 37 and to a shuttle valve 104 of the same construction and connected in the same manner as the shuttle valve 81. The other pressure line has a line section 105 with an orifice 106 extending from the outlet line 75 of the directional control valve to the steering valve 100 and a line section 107 connected to the displacement control DP for the pump 20 and to the shuttle valve 104. The first of said pressure lines including line sections 101 and 103 extends to the junction 84 and the second of the pressure lines including line sections 105 and 107 extends to the junction 79.

From the foregoing, it will be seen that the speed of the transmissions is set by the speed control valve of the control 70 and with the general operation either in neutral, forward or reverse being set by the directional control valve 73. A common control pressure signal is thus directed to either of the outlet lines 74 and 75 and, when directed to outlet line 74, goes to pressure lines having line sections 76 and 101 for causing operation of both transmissions in forward direction at the same speed. In reverse operation, the control pressure signal passes through outlet line 75 to the pressure lines having line sections 82 and 105 for causing uniform speed of operation of both transmissions in a reverse direction. As mentioned previously, the direction and speed of one transmission relative to the other may be varied by operation of one or the other of the steer valves 77 and 100 which provides a turn capability for the dual path transmission.

In a dual path hydrostatic transmission, it is possible for there to be mistracking between the two drives because of manufacturing tolerances and inefficiencies of the transmissions. In order to correct this tendency to mistrack, the dual path hydrostatic transmission disclosed herein has a tracking control in the form of valve means associated with the outputs of the two hydrostatic transmissions for sensing a difference in speed therebetween and modifying a control pressure in a pressure line to one of the transmissions whereby the displacement control thereof is adjusted to bring the associated transmission to a speed which synchronizes its speed with that of the other transmission.

The tracking control acts to modify a control pressure applied to a displacement control valve and thus all control action takes place against one end of the valve.

Figure 3:
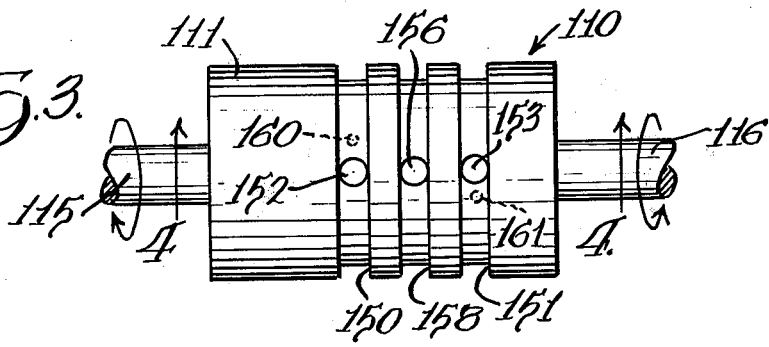
FIG. 3 is a diagrammatic view of the tracking control valve.
Figure 4:
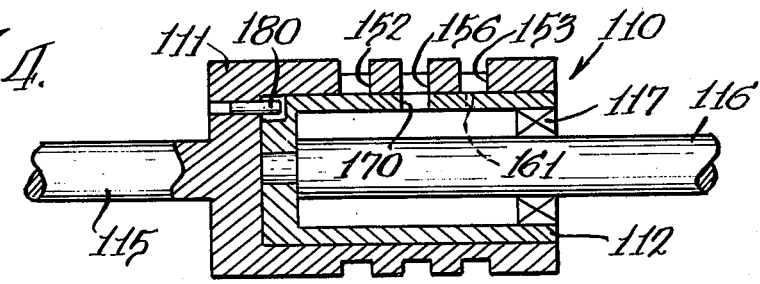
FIG. 4 is a vertical section, taken generally along the line 4—4 in FIG. 3.

As shown generally in FIGS. 1, 3 and 4, the tracking control has a rotary valve, indicated generally at 110, with a pair of nested, relatively rotatable valve members including an outer valve member 111 and an inner valve member 112. The outer valve member 111 has a shaft extension 115 for either direct or indirect connection to the motor 11 and propulsion member 18 of one transmission for rotation at the same speed or a speed proportional to that of the propulsion member. The inner valve member 112 is rotated at a speed proportional to the output speed of the transmission motor 21 and the propulsion member 19 by means of a shaft member 116. This drive connection is yieldable by means of a slip clutch 117 provided in the drive train whereby the inner valve member 112 and the shaft member 116 may move relative to each other.

Figure 5:
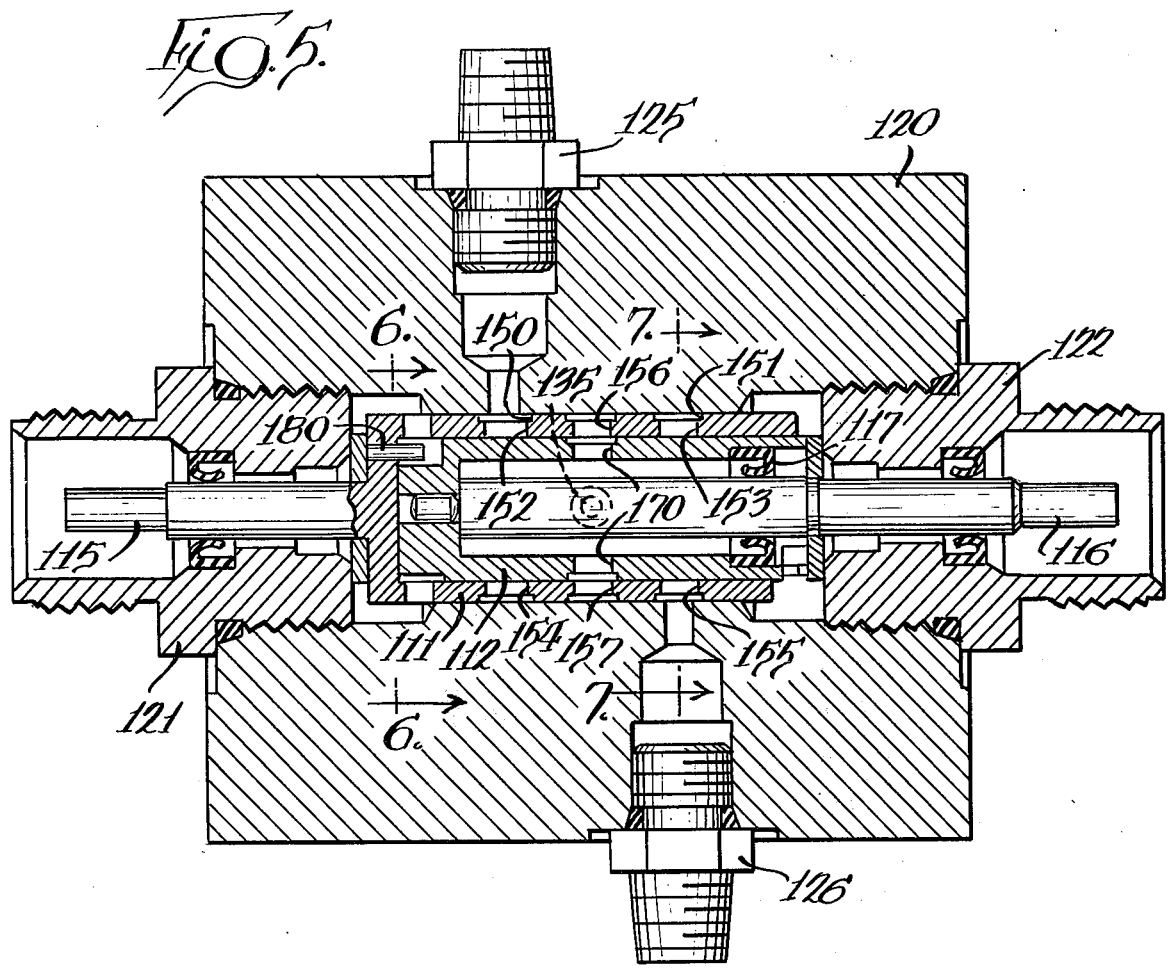
FIG. 5 is a central vertical section of the rotary valve of the tracking control.
Figure 6:
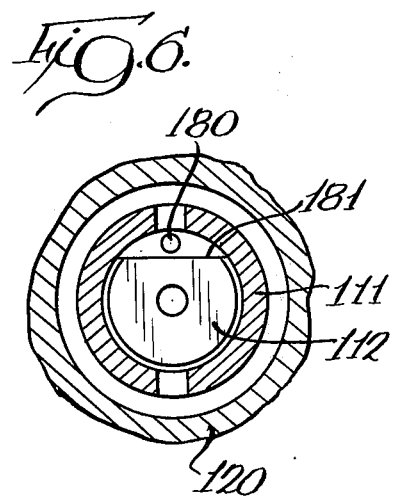
FIG. 6 is a vertical transverse section, taken generally along the line 6—6 in FIG. 5.
Figure 7:
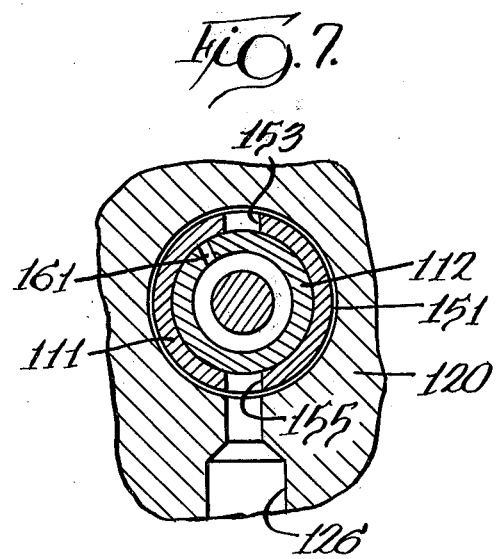
FIG. 7 is a vertical transverse section, taken generally along the line 7—7 in FIG. 5.

The structure of the rotary valve is shown more particularly in FIGS. 5, 6 and 7 and includes a body 120 with an open-ended bore rotatably mounting the valve members 111 and 112 and with the shaft extensions 115 and 116 extending outwardly of the bore and through threaded closure members 121 and 122.

The body 120 of the rotary valve has a pair of inlet ports 125 and 126 connected to the pressure line junctions 84 and 79, respectively, by a pair of lines 130 and 131, as shown in FIG. 1. The rotary valve also has a connection to sump S by means of sump port communicating with the valve bore and with the sump port 135 being indicated in broken line in FIG. 5.

Each of the junctions 79 and 84 represents a junction between a pressure line from the pair of pressure lines associated with one transmission and a pressure line from the pair of pressure lines associated with the other transmission. Specifically, the junction 79 represents a connection of pressure line section 78 and pressure line section 107. The first of these has a control pressure when the transmission having motor 11 is operated in the forward direction, while the second has a control pressure when the motor 21 of the other hydrostatic transmission is operating in a reverse direction. The junction 84 connects the pressure line section 83 which carries a control pressure when transmission motor 11 is operating in a reverse direction and line section 103 which carries a control pressure when transmission motor 21 is operating in a forward direction. Each of the junctions 79 and 84 has a double-acting check valve which, in effect, constitutes oppositely-acting check valves to block cross-communication between the pair of pressure lines at the junction while permitting connection of one or the other of the pressure lines to the rotary valve 110. As shown in FIG. 1, an oppositely-acting check valve has a ball 140 positioned when pressure line 78 has a control pressure to block connection with pressure line section 107 and permit control pressure to communicate through line 131 with the inlet port 126 of the rotary valve. Similarly, in forward operation, the pressure line secton 103 acts on a ball check 141 of the oppositely-acting check valve at the junction 84 to block communication with the pressure line section 83 and permit communication through line 130 with inlet port 125 of the rotary valve 110. With the junctions and check valves, it is possible to have the rotary valve 110 operates to modify a control pressure applied to the displacement control of both transmissions for tracking control and to exercise this control in both forward and reverse operation of the transmissions.

The relatively rotatable valve members 111 and 112 have port means controlling flow communication between one or the other of the lines 130 and 131 extending to the pressure lines and the sump S. The outer valve member 111 has a pair of external peripheral grooves 150 and 151 in alignment with the inlet ports 125 and 126, respectively, and with there being a pair of axially-spaced ports 152 and 153 connecting the grooves 150 and 151, respectively, with the interior of the valve member 111. The pair of ports 152 and 153 are spaced axially of the rotary valve and lie in a plane generally passing through the axis of rotation of the rotary valve. For increased communication through the valve member 111, the port means may include a second pair of ports 154 and 155, located in positions corresponding to the ports 152 and 153.

An additional pair of ports 156 and 157 connect the interior of the outer valve member 111 with a peripheral external groove 158 which communicates with the sump port 135.

The inner valve member 112 has port means including a pair of ports 160 and 161 which are sufficiently small in size to provide only for restricted flow. The ports 160 and 161 are axially-spaced, similarly to ports 152 and 153 of the outer valve member, whereby planes which are transverse to and radial of said axis of rotation of the rotary valve pass through ports of both valve members. The ports 160 and 161 of the inner valve member lie one to either side of the axial plane which passes through the outer valve ports 152 and 153 and as shown in FIG. 3. In the embodiment of FIGS. 1–7, the relation of the port means of the two valve members of the rotary valve is as shown in FIG. 3 when the output speeds of the transmission and, therefore, the speeds of the propulsion members are synchronized. With the direction of rotation of the transmissions, as indicated by the arrows in FIG. 3, when there is a mistracking and an increase in speed of the transmission motor 11, the outer rotary valve member 11 moves forward relative to the inner valve member to bring the port 153 to gradually increasing communicating relation with the flow-restricting port 161 of the inner valve member 112. This functions to reduce the control pressure in the pressure line having the line section 78 whereby the speed of the transmission motor 11 is reduced. The control pressure is reduced by the connection of the pressure line section 78 to the sump S through the connecting line 131 which connects into the junction 79 and through the port means of the rotary valve members. The connection to sump through the rotary valve is completed by a pair of ports 170 through the inner valve member 112 which communicate with the ports 156 and 157 of the outer valve member which communicate with the sump port 135. The arcuate extent of the ports 170 in the inner valve member and the ports 156 and 157 in the outer valve member is sufficient whereby there is communication therebetween through a substantial amount of rotary displacement of one valve member relative to the other. As a result, there is communication to the sump S from the interior of the inner valve member in all positions of adjustment of the valve members relative to each other.

Assuming the transmission motor 21 and propulsion member 19 increase in speed relative to the output of transmission motor 11, there is then an advance of the inner valve member relative to the outer valve member to bring the flow-restricting port 160 into communicating relation with the port 152 of the outer valve member, whereby the control pressure existing in the pressure line to the transmission having motor 21 is reduced and specifically in the line section 103 extending to the junction 84 and communicating with the connecting line 130. The control pressure adjusts to effect the displacement control until the speeds of the two transmissions and propulsion members are again synchronized.

If the transmissions are operating in a reverse direction of rotation, the pressure lines having line sections 83 and 107 then contain a control pressure to have the check valves 140 and 141 shifted oppositely from the position shown in FIG. 1 whereby said line section communicate with the connecting lines 130 and 131 to the rotary valve 110. When a mismatch in speeds occurs, there is then the same relative movement of the rotary valve members to bring the port means of the valve members into flow communication with the sump to appropriately reduce the control pressure in one of the pressure lines to bring the transmissions and propulsion members back into synchronization.

For simplicity in the structure of the rotary valve, the travel of one valve member relative to the other is limited by a pin 180 carried by the outer valve member 11 and extending into a recess in one end of the inner valve member 112. As shown in FIG. 6, this recess has a flat surface 181 which, after a certain extent of relative movement of one valve member relative to the other in either direction, will come into contact with the pin 180 and limit further relative movement. The slip clutch 117 limits the torque applied to the rotary valve members.

In normal forward or reverse operation, there is a control pressure in a pressure line of each of the displacement controls but without any flow through the lines. This control pressure maintains the balls of the check valves 140 and 141 in position to block flow through the junction at the connection of the pressure lines. When the transmissions and propulsion members move out of synchronization, the tracking control becomes operative to modify the control pressure in one of the lines, with there being metering initially across the partial opening between the ports of the two valve members and with there being full opening between with further correction and, at that time, a port of the inner valve member functions as a flow restriction. The maximum pressure drop in the displacement control pressure lines and, therefore, the maximum possible correction by the straight tracking control, is determined by the combination of operative orifices in the pressure lines and the flow-restricting orifices provided by the ports 160 and 161 in the inner valve member. More specifically, in forward operation, the maximum pressure drop in pressure line sections 78 and 103 is determined by the combination of orifices 90 and 102 in the pressure lines and the inner valve member flow-restricting ports. The latter are sized somewhat smaller than the orifices 90 and 102, as well as the orifices 91 and 106 in the other two pressure lines, whereby the maximum pressure drop, as an example, may be approximately in the range of 10% of the set control pressure.

An important feature of the tracking control disclosed herein is the manner in which it coacts with the steering control provided by operation of the steering control valves 77 and 100. Operation of a steering control valve does not "block out" the action of the tracking control during steering. If the vehicle is moving forward with the rotary valve positioned as shown in FIG. 3 and an operator purposely actuates the steering valve 77 to reduce the control pressure in the pressure line having line section 78, this will cause the transmission motor 11 to slow down which then causes the rotary valve of the tracking control to move into a correcting action and drop the pressure in the pressure line having line section 103 whereby the transmission motor 21 slows down. The correction action will continue until the pin 180 contacts the flat surface 181 and the slip clutch 117 permits slippage. Further reduction in the speed of the transmission motor 11 resulting from a drop in the control pressure as set by movement of the steering control valve results in turning of the vehicle. Similar action would occur if the steering valve 100 were operated. With this control, there is a gradual and proportionate override of the tracking control and not an instantaneous cancellation of any tracking control that may be in operation. In the prior art, it has been possible to be correcting for a tendency to go right and, if an operator steers right, he would go further to the right than expected. In the control disclosed herein, an operator may have to move a steering control valve further than in the prior art but he would still get the correct steering action.

The tracking control disclosed in the embodiment of FIGS. 1 to 7 controls by a drop in a control pressure for the transmission which is operating at a speed in excess of the other transmission. A variation which provides for a rise in the control pressure by the tracking control is also possible, with the differing structure in such a system being the structure of the rotary control valve. The rotary control valve in a pressure rise system is shown in FIG. 8 at 110' and with the parts corresponding to the parts of the rotary control valve shown in FIG. 3 of the first embodiment being given the same reference numeral with a prime affixed thereto.

Figure 8:
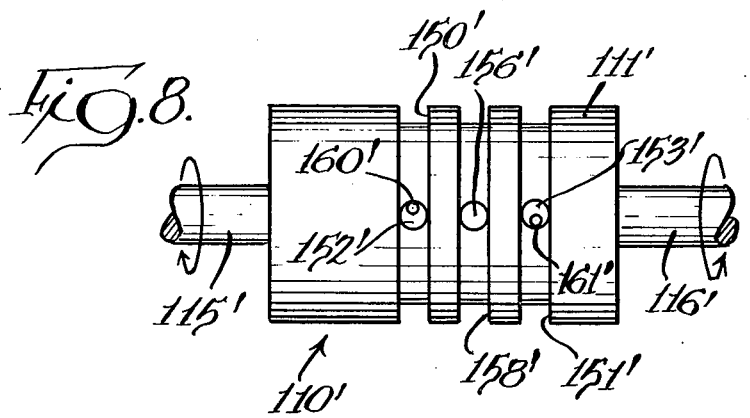
FIG. 8 is a schematic view of a tracking control valve of a second embodiment.

The rotary valve structure shown in FIG. 8 differs from that shown in FIG. 3 only to the extent that the pair of flow restricting ports 160' and 161' of the internal valve member are positioned closer to a plane containing the axis of rotation of the rotary valve and passing centrally through the ports 152', 153' and 156' of the outer valve member 111'. When both transmissions are operating at the same speed, the ports 160' and 161' are in flow communication with the port means of the outer valve member whereby the control pressures in the pressure lines are both reduced by some preset amount, as for example 10%. When the transmission speeds move out of synchronization, there will be a closing-off of one of the flow-restricting ports 160' or 161' relative to the port means of the outer valve member whereby a control pressure will increase in a pressure line for one transmission to increase the speed of the latter and bring the two transmissions back into synchronization. For example, in the forward operation as described in FIG. 1, if transmission motor 21 and propulsion member 19 increase in speed, the inner valve member will advance with respect to the outer valve member due to the direction of rotation as indicated by the arrow in FIG. 8 which will move flow-restricting port 161' out of complete communication with port 153' to increase the full pressure in pressure line section 78 to thus increase the output speed of transmission motor 11 and propulsion member 18 and bring the transmissions back into synchronization. During this advancing movement of the inner valve member, there is no change in control pressure in the pressure line to the displacement control for transmission having pumps 20 and motor 21, since the flow restricting port 160' continues in full communication with the port 152'. Similar logic applies for adjustment of speed when transmission motor 11 and propulsion member 18 increase in speed and when the transmissions are operating in reverse direction of rotation. The pressure rise system is one wherein the transmissions and, therefore, a vehicle driven thereby does not slow down during corrective action and, in fact, there may very well be a slight increase in speed of the vehicle.

Figure 9:
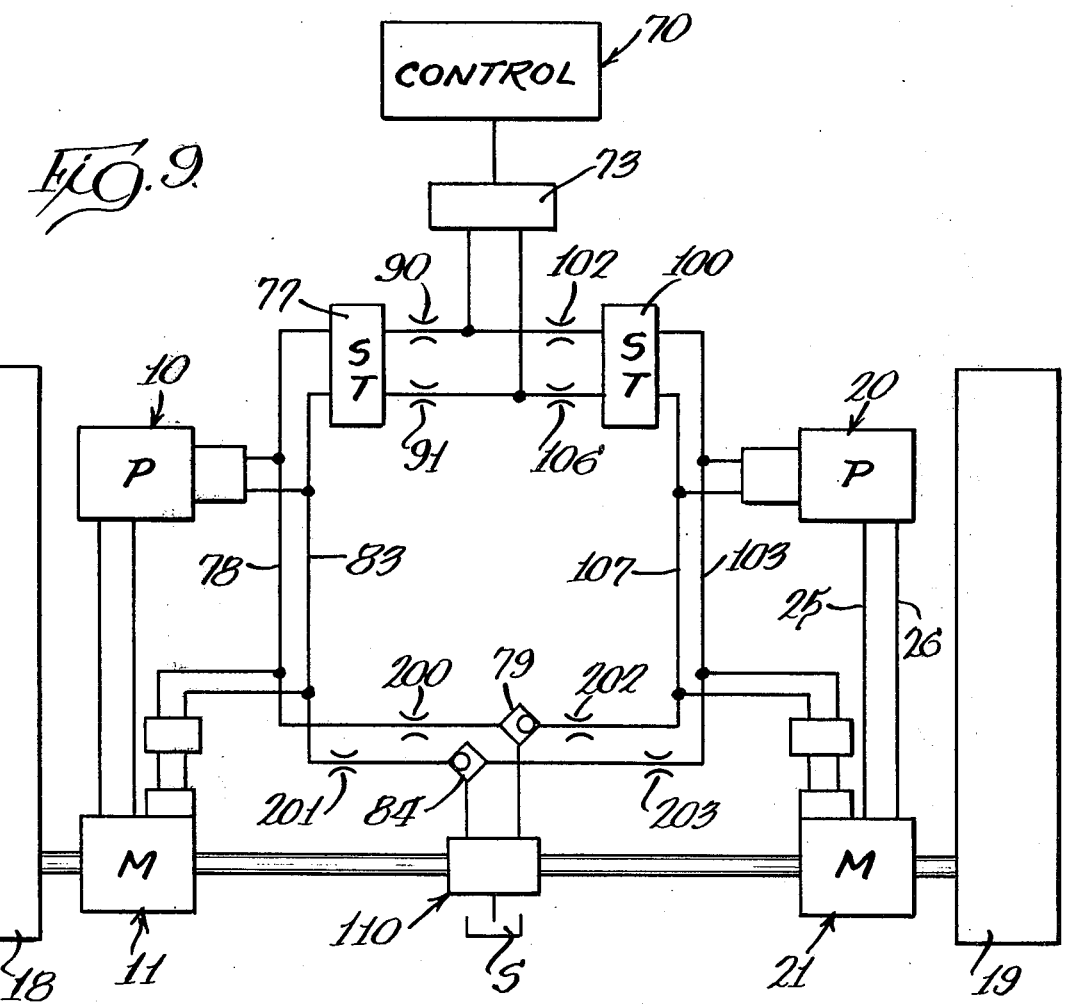
FIG. 9 is a schematic view of another embodiment of the dual path hydrostatic transmission, with tracking control.

A third embodiment of the invention is shown in FIG. 9 which corresponds to the schematic showing of FIG. 1 except for the addition of further flow-restricting elements in the pressure lines for the displacement control. Parts illustrated in FIG. 9 which are the same as illustrated in FIG. 1 are given the same reference numerals as in FIG. 1.

The flow-restricting orifices 90, 91, 102 and 106 in the pressure lines are selected to give proper steering characteristics for the two hydrostatic transmissions and in actual practice they may be of different sizes. When this occurs, the same maximum correcting pressure drop resulting from operation of the rotary control valve may not occur in all of the pressure lines. In order to assure that the same maximum correcting pressure drops in all pressure lines, an additional flow-restricting orifice is added in each of the pressure lines in advance of the junctions 79 and 84. As shown in FIG. 9, a flow-restricting orifice 200 is in the pressure line section 78, a flow-restricting orifice 201 is in the pressure line section 83, a flow-restricting orifice 202 is in the pressure line section 107, and a flow-restricting orifice 203 is in the pressure line section 103. These individual flow-restricting orifices can be selected of sizes in order to give equal maximum pressure corrections in all pressure lines from operation of the rotary control valve. This structure also simplifies the manufacture of the rotary valve, since the size and tolerance of the ports 160 and 161 of the inner valve member which act as flow-restricting orifices can be increased.

Although not illustrated in the drawings, there is another alternate to the drive system and tracking control wherein the sump port 135 of the rotary control valve would be connected to the sumped side of the motor displacement valves DM. As mentioned previously, the application of control pressure is always to one end of the displacement control valve 36 for the motor 11 and the line 87 returns control fluid to sump. The sump port 135 of the rotary control valve would be connected into the line 87. This connection could have two effects not provided by the systems shown in FIGS. 1 to 8. Whenever the pressure set by the speed control valve of the control 70 is zero, then the pressure across the inlet ports and the sump port of the rotary control valve will remain at zero differential and avoid any slight differential pressure across the ports of the rotary control valve which might occur and cause creep if the sump port 135 were connected into different points in the system. Additionally, as the steering function is applied by operation of either the steering valve 77 or 100, the pressure drop across the rotary control valve in the embodiments of FIGS. 1 to 8 would go to zero, thus reducing the effect of the tracking control during turns.

Although the control disclosed herein is specifically disclosed as a tracking control for a dual path hydrostatic transmission as applied to a vehicle, it will be obvious that the control can be utilized for synchronizing the output of two hydrostatic transmissions in any use thereof and, thus, the control in its broadest aspects relates to a synchronous control system.

In using the dual hydrostatic transmissions for drive of a vehicle and with the synchronous control system, it will be obvious that the outputs of the two transmissions may be for driving tracks or wheels at opposite sides of a vehicle or fore and aft wheels at one side of a vehicle, such as an articulated vehicle.

I claim:

1. A synchronous control system for a pair of hydrostatic transmission with each of the latter having a pressure-responsive displacement control for one of the pump or motor of each hydrostatic transmission for controlling the output speed of the transmission, means for establishing a control pressure, and means including a pair of pressure lines with flow restrictors extended fron said control pressure establishing means and one to each displacement control for applying the control pressure to the displacement controls, said system comprising: a rotary valve with a pair of relatively rotatable valve members; means for rotating one of said valve members at a speed proportional to the output speed of one transmission; means for rotating the other of said valve members at a speed proportional to the output speed of the other transmission; said rotary valve having an outlet connected to a sump and a pair of inlets connected one to each of said pressure lines; and said valve members each having port means coacting to control the flow communication between said inlets and said sump and with the relation between the port means of the valve members varying corresponding to a difference in the output speeds of the hydrostatic transmissions to modify the control pressure in one of said pressure lines and synchronize the speed of the hydrostatic transmissions.

2. A synchronous control system as defined in claim 1 wherein the port means of the valve members are in flow communication to connect said inlets to said sump when said transmissions are operating at the same speed with the port means in at least one valve member being sufficiently small to permit only a restricted rate of flow to sump, and a variation in output speeds of said transmission causing a shift in relation of said port means to reduce flow from one inlet to said sump for a build-up of control pressure in one pressure line to modify the operation of the associated displacement control.

3. A synchronous control system as defined in claim 1 wherein the port means of the valve members are out of flow communication when said transmission are operating at the same speed, the port means in at least one valve member being sufficiently small to permit only a restricted rate of flow to sump, and a variation in output speeds of said transmission causing a shift in relation of said port means to place one inlet in communication with said sump and cause flow from said one inlet to said sump for a decrease of control pressure in one pressure line to modify the operation of the associated displacement control.

4. A synchronous control system as defined in claim 1 including a pair of lines extended one between each pressure line and a rotary valve inlet, and an orifice in each line to provide for equal maximum pressure correction in both of said pressure lines.

5. A synchronous control system as defined in claim 1 wherein the port means of one valve member includes a pair of axially spaced ports lying in a plane generally passing through the axis of rotation of the rotary valve, and the port means of said other valve member include a pair of axially spaced ports whereby planes which are transverse to and radial of said axis of rotation pass through ports of both valve members, and the ports of the other valve member lying one to either side of said first-mentioned plane whereby relative rotation of said valve members moves one of the last-mentioned ports toward concentricity with one port of said one valve member and moves the other port of the other valve member away from the other port of said one valve member.

6. A synchronous control system as defined in claim 5 wherein said pair of ports of the other valve member are sufficiently small to function as restricted flow orifices.

7. A synchronous control system as defined in claim 5 wherein both of said pairs of ports are in flow communication when said transmissions are at the same speed and one or the other of said ports of said other valve member moves out of flow communication when one transmission speed varies from the other.

8. A synchronous control system as defined in claim 5 wherein both of said pairs of ports are out of flow communication when said transmission are at the same speed and one or the other of said ports of said other valve member moves into flow communication with a port of said one valve member when one transmission speed varies from the other.

9. A synchronous control system as defined in claim 1 wherein said pair of hydrostatic transmissions may operate with either forward or reverse direction of output, a pressure line extending to each of said displacement controls in addition to one of said pair of pressure lines whereby direction of output is determined by the pressure line which has the control pressure and with the other pressure line for a displacement control being connected to said sump, said control system further including: a pair of junctions with one junction between two of said pressure lines which control forward operation of one transmission and reverse operation of the other, a connecting line from each of said junctions to a rotary valve inlet, a pair of oppositely acting check valves at each junction for connecting one or the other of said last-mentioned pressure lines to said inlet and blocking communication between said last-mentioned pressure lines whereby said rotary valve may synchronize the transmission speeds in either forward or reverse operation.

10. A synchronous control system as defined in claim 9 wherein said transmissions are provided for driving a pair of tracks of a tracked vehicle, a speed control valve for setting a common control pressure applied through a pressure line to both transmissions, and a pair of steering control valves between said speed control valve and each of said displacement controls for modifying the control pressure in a pressure line to one displacement control without modifying the control pressure in a pressure line to the other displacement control.

11. A drive for a vehicle including a pair of hydrostatic transmissions with the outputs of said transmissions being reversible and for driving a pair of propulsion members; a displacement control associated with each transmission including a pair of pressure lines whereby a control pressure in one pressure line causes forward operation and a control pressure in the other pressure line causes reverse operation; a circuit including a speed control valve for setting a control pressure, a directional control valve for controlling the delivery of the control pressure to those of said pressure lines which provide forward or reverse operation as selected, and a pair of steering control valves associated one with each displacement control for modifying the value of the control pressure and selectively delivering the control pressure to the other of an associated pair of said pressure lines; and tracking control means including a valve in circuit with said pressure lines and operable in response to a difference in speed of said propulsion members for modifying the control pressure in one of the two pressure lines carrying the control pressure to bring said propulsion members back to synchronization.

12. A vehicle drive as defined in claim 11 wherein the forward direction pressure line of each transmission is connected to the reverse direction pressure line of the other transmission and with a pair of oppositely acting check valves preventing continuous flow therethrough, said tracking control valve having a pair of inlets and a line connecting a valve inlet into said joined pressure lines intermediate the pair of check valves to receive said control pressure.

13. A vehicle drive as defined in claim 12 wherein said tracking control valve is a rotary valve with a pair of relatively rotatable valve members and each having port means coacting to control the flow communication between said valve inlets and a sump with the relation between the port means varying corresponding to a difference in the output speeds of the propulsion members.

14. A vehicle drive as defined in claim 13 wherein the port means of the valve members are in flow communication to connect said inlets to said sump when said propulsion members are operating at the same speed with the port means in at least one valve member being sufficiently small to permit only a restricted rate of flow to sump, and a variation in output speeds of said propulsion members causing a shift in relation of said port means to reduce flow from one inlet to said sump for a build-up of control pressure in one pressure line to modify the operation of the associated displacement control.

15. A vehicle drive as defined in claim 13 wherein the port means of the valve members are out of flow communication when said propulsion members are operating at the same speed, the port means in at least one valve member being sufficiently small to permit only a restricted rate of flow to sump, and a variation in output speeds of said propulsion members causing a shift in relation of said port means to place one inlet in communication with said sump and cause flow from said one inlet to said sump for a decrease of control pressure in one pressure line to modify the operation of the associated displacement control.

16. A vehicle drive as defined in claim 13 wherein said rotary valve includes flow restrictors whereby control pressure may only be varied up to a maximum amount approximately equal to 10% of the set control pressure, said rotatable valve members are interconnected for a limited degree of relative movement whereby steer control of the vehicle drive will override the tracking control, a pair of drive connections one between each propulsion member and a rotatable valve member and one of said drive connections including a slip clutch.

17. A drive for a vehicle including a pair of hydrostatic transmissions with the outputs of said transmissions being reversible and for driving a pair of propulsion members; a displacement control associated with each transmission including a pair of pressure lines whereby a control pressure in one pressure line causes forward operation and a control pressure in the other pressure line causes reverse operation; a circuit including a speed control valve for setting a control pressure, a directional control valve for controlling the delivery of the control pressure to those of said pressure lines which provide forward or reverse operation as selected, and a pair of steering control valves associated with one each displacement control for modifying the value of the control pressure and selectively delivering the control pressure to the other of an associated pair of said pressure lines; and tracking control means including a rotary valve having a pair of inlets and an outlet to sump, a pair of connecting lines for connecting said inlets one to each of a junction between a pressure line from each of said displacement controls, a pair of check valves positioned adjacent said junction to prevent flow through said last-mentioned pressure lines but to permit flow to an inlet of said rotary valve, a pair of relatively rotatable valve members in said rotary valve and connected one to each of said propulsion members for proportional rotation therewith and each valve member having port means operable in response to a difference in speed of said propulsion members for modifying the control pressure in one displacement control to bring said propulsion members into synchronization.

18. A vehicle drive as defined in claim 17 wherein the port means of one valve member includes a pair of axially spaced ports lying in a plane generally passing through the axis of rotation of the rotary valve, and the port means of said other valve member include a pair of axially spaced restricted ports whereby planes which are transverse to and radial of said axis of rotation pass through ports of both valve members, and the ports of the other valve member lying one to either side of said first-mentioned plane whereby relative rotation of said valve members moves one of the last-mentioned ports toward concentricity with one port of said one valve member and moves the other port of the other valve member away from the other port of said one valve member.

19. A vehicle drive as defined in claim 17 wherein a flow-restricting orifice is associated with each pressure line to provide adjustability for proper steering characteristics, and a second flow-restricting orifice in each pressure line which provide adjustability for equal maximum correction in said control pressure by said rotary valve.

* * * * *